United States Patent
Lake et al.

(10) Patent No.: US 7,242,737 B2
(45) Date of Patent: Jul. 10, 2007

(54) SYSTEM AND METHOD FOR DATA PHASE REALIGNMENT

(75) Inventors: Sheehan D. Lake, Burlington, VT (US); David R. Stauffer, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/604,296

(22) Filed: Jul. 9, 2003

(65) Prior Publication Data

US 2005/0008110 A1    Jan. 13, 2005

(51) Int. Cl.
*H04L 25/00* (2006.01)
(52) U.S. Cl. ....................................... 375/372
(58) Field of Classification Search ................ 375/354, 375/372
See application file for complete search history.

(56) References Cited

U.S. PATENT DOCUMENTS

| | | | |
|---|---|---|---|
| 4,873,703 A | 10/1989 | Crandall et al. | |
| 5,256,912 A | 10/1993 | Rios | |
| 5,487,092 A | 1/1996 | Finney et al. | |
| 5,487,095 A | 1/1996 | Jordan et al. | |
| 5,504,927 A | 4/1996 | Okamoto et al. | |
| 5,701,447 A | 12/1997 | Hahn | |
| 5,774,697 A | 6/1998 | Hall | |
| 5,832,047 A | 11/1998 | Ferraiolo et al. | |
| 5,870,446 A | 2/1999 | McMahan et al. | |
| 5,905,391 A | 5/1999 | Mooney | |
| 5,915,107 A * | 6/1999 | Maley et al. ............... 713/400 |
| 5,923,193 A | 7/1999 | Bloch et al. | |
| 5,987,081 A | 11/1999 | Csoppenszky et al. | |
| 6,128,749 A | 10/2000 | McDonnell et al. | |
| 6,175,540 B1 | 1/2001 | Kim | |
| 6,175,603 B1 | 1/2001 | Chapman et al. | |
| 6,247,137 B1 | 6/2001 | Wickeraad | |
| 6,333,653 B1 | 12/2001 | Floyd et al. | |
| 6,345,328 B1 | 2/2002 | Rozario et al. | |

FOREIGN PATENT DOCUMENTS

| | | |
|---|---|---|
| JP | 8-55084 | 10/1995 |
| JP | 2001-265715 A | 8/2001 |

* cited by examiner

*Primary Examiner*—Kevin Kim
(74) *Attorney, Agent, or Firm*—Scully, Scott, Murphy & Presser, P.C.; Richard M. Kotulak, Esq.

(57) ABSTRACT

A system and method for aligning data transferred across circuit boundaries having different clock domains. The system includes a buffer circuit comprising a latch for receiving data clocked in a first clock domain and latching the received data in a second clock domain by one of a first edge of a second clock signal, or a second opposite edge of the second clock signal. The first and second clock signals are of the same frequency but operating out of phase. A control circuit receives the first and second clock signals and determines a phase relationship therebetween. The control circuit generates a control signal based on the determined phase relationship which is implemented for selecting one of a rising edge of the second clock signal, or a falling edge of the second clock signal, for latching action in the second clock domain. Reliable data transfer operation is provided for all possible phase relationships of the first and second clock signals.

20 Claims, 3 Drawing Sheets

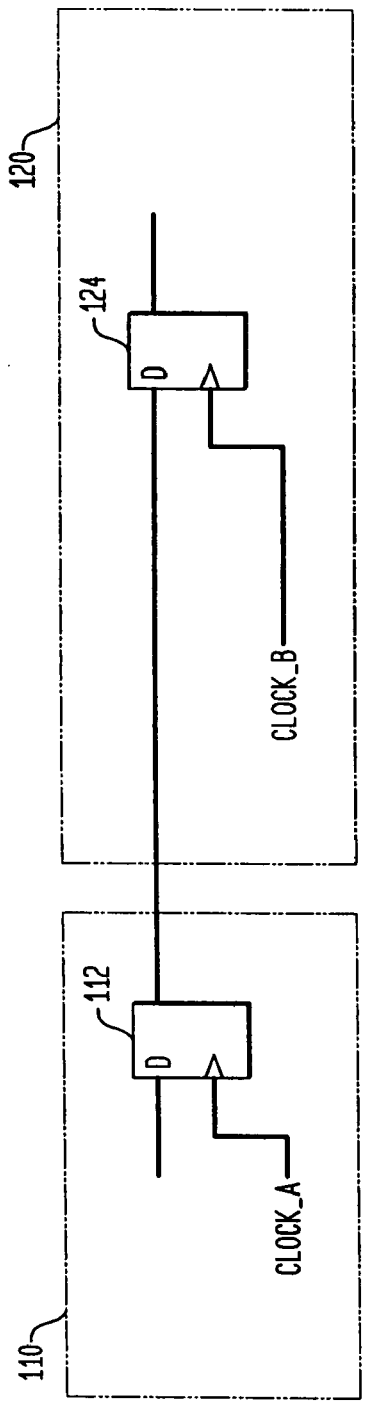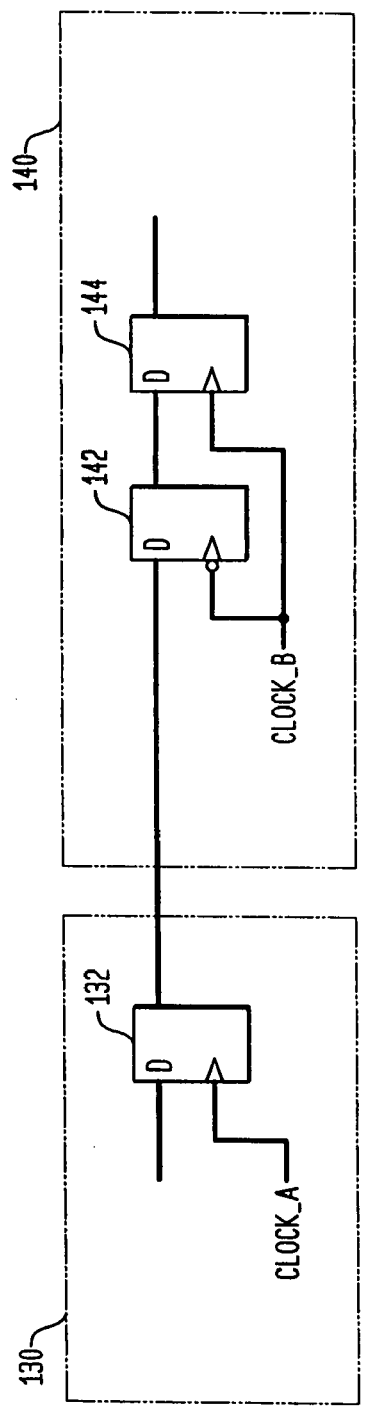

SYSTEM AND METHOD FOR DATA PHASE REALIGNMENT

BACKGROUND OF INVENTION

1. Field of the Invention

The present invention relates to high-speed, synchronous data transfer operations, and particularly, to a single stage delay clock crossing buffer circuit for enabling data transfer operations from a device being clocked at one domain, to another device clocked at a same frequency, but out of phase.

2. Description of the Prior Art

In many digital systems, there are often used independent clocks to drive different functional circuits. For example, certain processing blocks, e.g., bus, memory, I/O, may all operate on independent clocks. In complex logic designs having multiple clock domains, it is frequently required that data be transferred from one such clock domain to another such clock domain. Various techniques for such transfer are known to those skilled in the art; the technique selected being dependent on latency requirements, whether the clock frequencies are similar, etc.

A clock-domain crossing occurs when a signal data clocked by a first clock, e.g. a data transmit clock, is sampled by a register clocked by a second clock, e.g., receive clock, that is asynchronous to the transmit clock. FIG. 1(a) illustrates a circuit structure according to the prior art that includes an electronic flip-flop device 112, e.g., a D-flip flop, which is clocked in clock domain 110 by CLOCK_A, the output of which is connected to the input of another flip-flop device 124 which is clocked in a second clock domain 120 by CLOCK_B. If CLOCK_A and CLOCK_B are guaranteed to be the same frequency, then these domains are not asynchronous to each other, and for some phase relationships between CLOCK_A and CLOCK_B, the data transfer will function correctly. However for some phase relationships between CLOCK_A and CLOCK_B, the data will transition at the input to the second flip-flop device such that the setup and/or hold time of the flip-flop is violated. That is, the data signal may change value very close to the edge of the receive Clock_B, causing the output of the sampling device enter a meta-stable state or latch an erroneous value. As a result, the circuit will fail for these cases.

FIG. 1(b) illustrates a circuit structure according to the prior art that includes a flip-flop device 132 which is clocked in clock domain 130 by CLOCK_A, the output of which is connected to the input of another flip-flop device 142 which is clocked in a second clock domain 140 by CLOCK_B. Whereas the flip-flop device 124 in FIG. 1(a) was clocked by the rising edge of CLOCK_B, the flip-flop device 142 in FIG. 1(b) is clocked by the falling edge of CLOCK_B. The output of flip-flop 142 connects to an additional flip-flop device 144 which is clocked by the rising edge of CLOCK_B, thus providing equivalent phase alignment for the two cases. As in the circuit of FIG. 1(a), the circuit of FIG. 1(b) will work for some phase relationships between the clocks and will fail for other phase relationships.

For example, assuming that in each case (FIGS. 1(a) and 1(b)) the propagation delay of data from the rising edge of CLOCK_A, through the first flip-flop device, to the input of the second flip-flop device is less than one half of the clock cycle. Then, the phase relationships for which the circuit in FIG. 1(a) fails are mutually exclusive with the phase relationships for which the circuit in FIG. 1(b) fails. Since the phase relationship between CLOCK_A and CLOCK_B is unknown, neither circuit in FIG. 1 may be used reliably.

To avoid unpredictable behavior this instability, circuits must be designed to properly synchronize all signals that cross clock domain.

One typical solution to the problem, when transferring data from one clock domain to another of the same frequency, a large clock crossing buffer is provided with a write and read pointer incrementing from the respective clocks through the buffers. This approach has a data delay directly associated with the number of buffers. For instance, assuming that data must be transferred continuously across this clock domain crossing, one such solution is to implement a First-In First-Out (FIFO) register file. Data is written to the FIFO synchronous to CLOCK_A, and is read from the FIFO synchronous to CLOCK_B. The write address and read address are initialized such that at any given moment the FIFO register being written is never the same as the FIFO register being read. While effective, this solution requires a FIFO register N-deep and n-bit wide register file, where n is the width of the data path, and N is typically greater than or equal to 4. This solution also introduces approximately N/2 clock cycles of latency into the data path.

It would thus be highly desirable to provide a circuit structure and method for transferring data from one clock domain to another clock domain where the two clock domains are of the same frequency, and have fixed but unknown phase relationship to each other.

It would thus be highly desirable to provide a circuit structure and method for transferring data from one clock domain to another utilizing one or two buffers without violating set up and hold times.

SUMMARY OF INVENTION

It is an object of the present invention to provide a circuit structure and method for transferring data from one clock domain to another clock domain where the two clock domains are of the same frequency, and have fixed but unknown phase relationship to each other.

It is a further object of the present invention to provide a circuit structure and method for transferring data from one clock domain to another utilizing one or two buffers without violating set up and hold times.

The present invention teaches a single stage delay clock crossing buffer circuit for two clocks with stable phase relationships to each other. Using the relationship of the phase of the two clocks, data can be read in one clock domain and written to another using only two buffers and variations of the clocks so that read and write points never occur at the same time.

It is another object of the present invention to provide a circuit structure and method for transferring n-bits of data from one clock domain to another clock domain where the two clock domains are of the same frequency, and have fixed but unknown phase relationship to each other.

According to the present invention, there is provided a system and method for aligning data transferred across circuit boundaries having different clock domains. The system includes a buffer circuit comprising a latch for receiving data clocked in a first clock domain and latching the received data in a second clock domain by one of a first edge of a second clock signal, or a second opposite edge of the second clock signal. The first and second clock signals are of the same frequency but operating out of phase. A control circuit receives the first and second clock signals and determines a phase relationship therebetween. The control circuit generates a control signal based on the determined phase relationship which is implemented for selecting one of a rising edge of the second clock signal, or a falling edge of the second clock signal, for latching action in the second clock domain. Reliable data transfer operation is provided for all possible phase relationships of the first and second clock signals.

The present invention may be advantageously applied in a large die having a significant amount of clock skew. Integration of this clock crossing buffer circuit allows the data to realign with the circuits.

BRIEF DESCRIPTION OF DRAWINGS

Further features, aspects and advantages of the apparatus and methods of the present invention will become better understood with regard to the following description, appended claims, and the accompanying drawing where:

FIGS. 1(a) and 1(b) illustrate respective circuit diagrams demonstrating the clock-domain crossing phenomena that occurs when a signal data clocked by a first clock is sampled by a register clocked by a second clock that is asynchronous to the first clock.

DETAILED DESCRIPTION

The present invention is directed to a circuit structure and method for transferring data from one clock domain to another clock domain where the two clock domains are of the same frequency, and have fixed but unknown phase relationship to each other.

Figure 2:
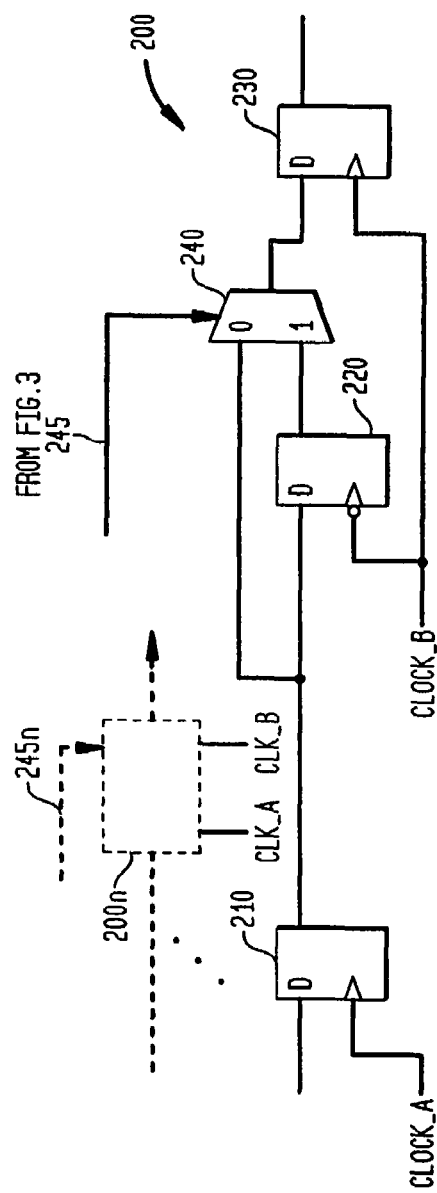
FIG. 2 illustrates a data path circuit according to a preferred embodiment of the present invention.

FIG. 2 depicts the circuit structure, herein referred to as a data path or clock crossing buffer circuit 200, of the present invention, for which multiple instances may be provided depending upon the width of the data path. Thus, as shown in FIG. 2, for a particular application, "n" instances of buffer circuit i.e., buffer circuits 200, . . . , 200n, may be utilized, where n is the width of the data path. As will be explained in greater detail below with respect to FIG. 3, there is described an embodiment of a control circuit 300 that provides a multiplexor select signal to all "n" instances of the clock crossing buffer circuit.

As shown in FIG. 2, the data path circuit 200 includes three flip-flop devices per data bit in the data path, which is at least one fewer than a typical prior art FIFO implementation with N=4. While the disclosed invention will result in a data path latency of approximately 1 clock cycle, it is at least one clock cycle less than a typical prior art FIFO implementation with N=4.

The data path circuit shown in FIG. 2 includes a first flip-flop device 210, e.g. a data-type or D flip-flop, which is clocked in the first clock domain by CLOCK_A, and two flip-flop devices 220, 230 which are clocked in the second clock domain by alternate edges of CLOCK_B. In one preferred aspect of the invention, the first flip-flop 210 is triggered on a clock rising edge, i.e., uses the rising edge of CLOCK_A to clock flip-flop 210; the second flip-flop 220 is triggered on the falling edge of CLOCK_B to clock flip-flop 220; and, the rising edge of CLOCK_B is used to clock the third flip-flop 230. It is understood that in an alternate embodiment (not shown), the falling edge of CLOCK_A may be used to clock flip-flop 210, the rising edge of CLOCK_B may be used to clock flip-flop 220, and the falling edge of CLOCK_B may be used to clock flip-flop device 230.

Figure 3:
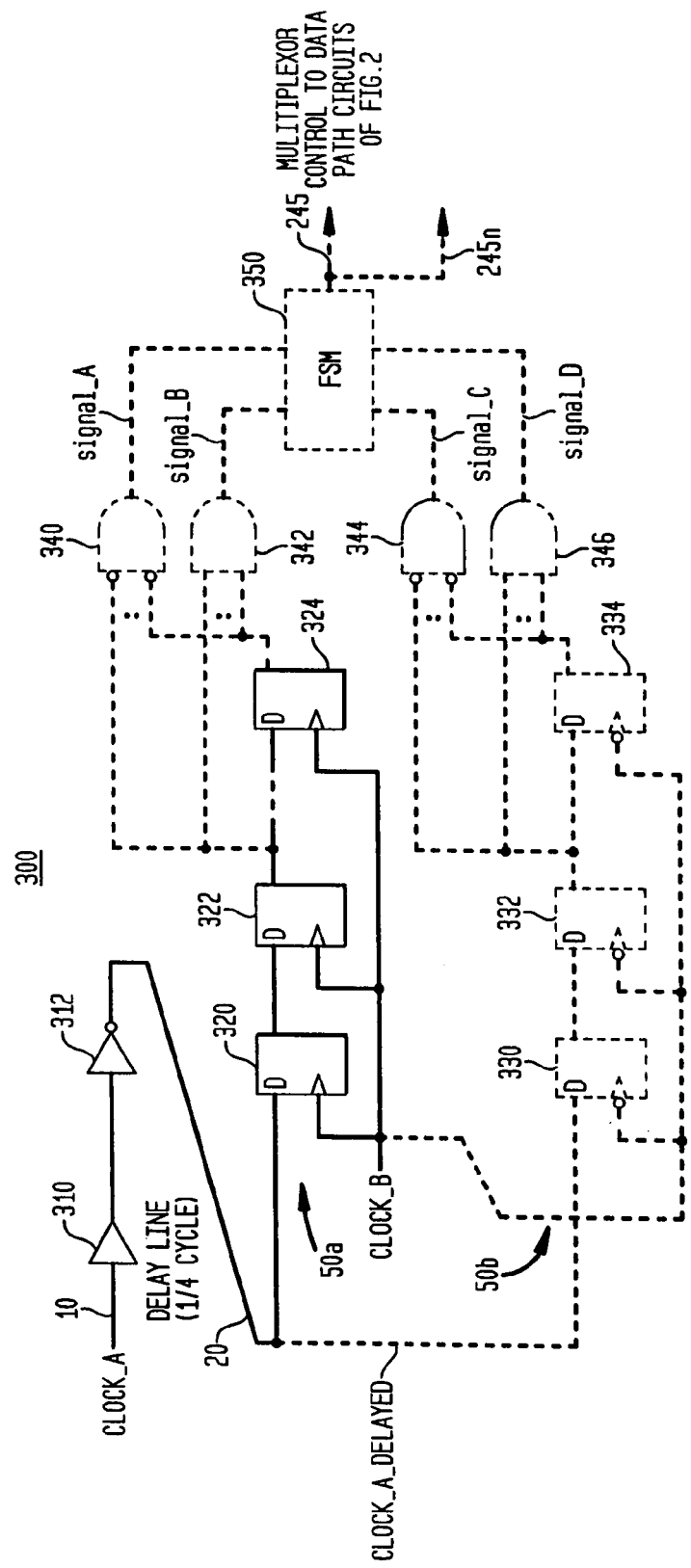
FIG. 3 illustrates a control circuit for ensuring reliable operation for all possible clock phase relationships in the data path circuit shown in FIG. 2.

The data path circuit shown in FIG. 2 additionally includes a multiplexor device 240 which selects between either the output of flip-flop device 210 or, the output of flip-flop device 220 as the input to flip-flop device 230. The multiplexor 240 is controlled in common with all such multiplexors for the n-bit wide data path by the control circuit 300 (FIG. 3). In a preferred embodiment shown in FIG. 2, when the multiplexor control signal 245 is equal to a logic '0', the output of flip-flop device 210 is selected as the input to flip-flop 230, and the circuit is the equivalent of FIG. 1(a). When the multiplexor control signal 245 is equal to a logic '1', the output of flip-flop device 220 is selected as the input to flip-flop device 230, and the circuit is the equivalent of FIG. 1(b). It is understood that in an alternative embodiment, an opposite polarity for the multiplexor control signal 245 may be used. It is the function of the control circuit to determine from the phase relationship between CLOCK_A and CLOCK_B which configuration may be used reliably, and to select multiplexor 240 accordingly. It is understood that the multiplexor select signal 245 is common to all bits in the n-bit wide data path.

It is understand that in an alternative embodiment, the first flip-flop device 210 in the first clock domain may be an integral part of the logic of the first clock domain, and not exclusively used by the data path circuit.

The control circuit 300 for determining the state of the multiplexor control based on the phase relationship between CLOCK_A and CLOCK_B is now described in greater detail with respect to FIG. 3.

Figure 4:
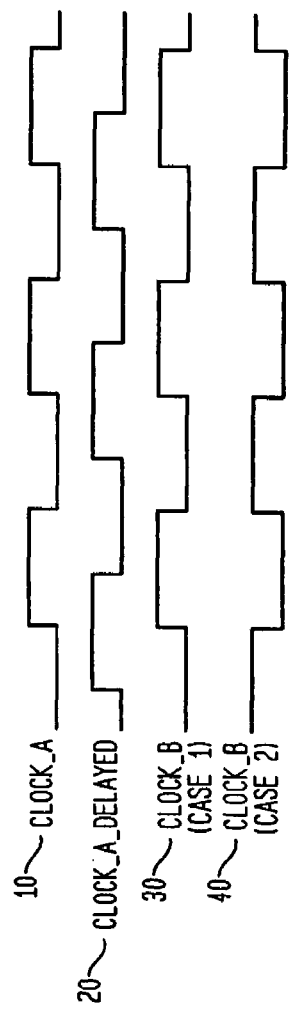
FIG. 4 depicts timing waveforms related to the data path control circuit of FIG. 3.

As shown in FIG. 3, the CLOCK_A input to control circuit 300 is delayed by approximately a ¼ clock cycle by a delay line element 310 and then is inverted by inverter device 320, resulting in the equivalent of a ¾ clock cycle delay. FIG. 4 illustrates in greater detail the timing relation between the CLOCK_A signal 10 and CLOCK_A_DELAYED signal 20 where the CLOCK_A_DELAYED signal is shown delayed ¾ of a clock cycle relative to the CLOCK_A signal.

FIG. 4 additionally illustrates two of the possible phases for CLOCK_B relative to CLOCK_A. For the CLOCK_B signal 30 in a first embodiment, the phase of CLOCK_B is substantially identical to CLOCK_A. In this case, clocking data in FIG. 2 directly from flip-flop device 210 to flip-flop device 230 may be unreliable. Therefore, in this case, the control circuit 300 for controlling multiplexor device 240 generates control signal 245 such that the output of flip-flop device 220 is selected as the input to flip-flop device 230. Data launched by the rising edge of CLOCK_A should be stable at the input to flip-flop device 220 at the falling edge of CLOCK_B, and therefore reliable operation results.

Further, in FIG. 4, for the case of CLOCK_B signal 40 in a second embodiment, the phase of CLOCK_B is opposite of CLOCK_A. In this case, data is not reliably latched by flip-flop 220 in FIG. 2. However, clocking data directly from flip-flop 210 to flip-flop 230 is reliable in this case. Therefore, in this case, the control circuit 300 for controlling multiplexor device 240 generates control signal 245 such that the output of flip-flop device 210 is selected as the input to flip-flop device 230.

Returning to FIG. 3, the CLOCK_A_DELAYED signal 20 is clocked into two synchronizer paths 50a, 50b, each path comprising a plurality of serially connected flip-flop devices. Flip-flops 320, 322, 324 of the first synchronizer path 50a are clocked on the rising edge of CLOCK_B, while flip-flops 330, 332, 334 of the second synchronizer path 50b are clocked on the falling edge of CLOCK_B. Although each synchronizer path is illustrated as comprising three flip-flop devices in FIG. 3, longer chains of comprising additional serially connected flip-flop devices may be used to improve reliability. For the case of the phase relationship of CLOCK_B signal 30 in FIG. 4, flip-flop devices 320, 322, 324 will consistently latch a '1' value, based on the state of CLOCK_A_DELAYED at the input to the first flip-flop 320, while flip-flops 330, 332, 334 will consistently latch a '0' value. For the case of the phase relationship of CLOCK_B signal 40 in FIG. 4, flip-flop devices 320, 322, 324 will consistently latch a '0' value, and flip-flop devices 330, 332, 334 will consistently latch a '1' value.

As further shown in the control circuit 300 of FIG. 3, in the first synchronizing path 50a, there is provided a connected logic circuit comprising a NOR gate 340 and an AND gate 342, each gate respectively producing a signal_A and signal_B; and in the second synchronizing path 50b, there is provided a connected logic circuit comprising a NOR gate 344 and an AND gate 346, each gate respectively producing a signal_C, and signal_D. These gates are shown as having two inputs, but would have more inputs if the corresponding synchronizer paths had additional stages. The NOR gate 340 of path 50a asserts signal_A when flip-flop device 322, 324 outputs are all '0'; and AND gate 342 asserts signal_B when these flip-flop device outputs are all '1'. Likewise, the NOR gate 344 asserts signal_C when flip-flop device 332, 334 outputs are all '0'; and AND gate 346 asserts signal_D when these flip-flop device outputs are all '1'.

According to the invention, the provision of two synchronizer paths 50a, 50b clocked by opposite edges of CLOCK_B is necessary, because depending on the phase of CLOCK_B relative to CLOCK_A_DELAYED, one or the other of the synchronizers may fail to reliably latch a constant value due to meta-stability and jitter effects of the clock. For example, if the CLOCK_A_DELAYED signal transitions coincident with the rising edge of CLOCK_B, then flip-flop device 320 of the first synchronizer path 50a may sometimes latch '0' and sometimes latch '1', and, as a result both signal_A and signal_B would not be asserted. Likewise, if the CLOCK_A_DELAYED signal transitions coincident with the falling edge of CLOCK_B, then flip-flop device 330 may sometimes latch '0' and sometimes latch '1', and as a result both signal_C and signal_D would not be asserted. However, only one of these cases can exist for a given phase relationship, and therefore at least one of the synchronizer paths 50a, 50b will provide a reliable indication of the correct value for the multiplexor selection.

As further shown in FIG. 3, the signals signal_A, signal_B, signal_C, and signal_D are input to a 1-bit Finite State Machine (FSM) which is configured to transition to a state '0' in the preferred embodiment if the following Boolean equation is true:

(signal_A AND signal_D) OR (signal_A AND NOT signal_C AND NOT signal_D) OR (signal_D AND NOT signal_A AND NOT signal_B)

This state machine transitions to state '1' in the preferred embodiment if the following Boolean equation is true:

(signal_B AND signal_C) OR (signal_B AND NOT signal_C AND NOT signal_D) OR (signal_C AND NOT signal_A AND NOT signal_B)

Otherwise, the state machine remains in its current state. As shown in FIG. 3, the state output 245 of this state machine 350 is the multiplexor control signals 245, . . . 245n for input to respective clock crossing buffer circuits 200, . . . 200n of FIG. 2. It is understood that for alternate embodiments, the polarity of state transitions may be reversed.

The circuit of this invention creates a reliable design because set up and hold is guaranteed during data transfer from a latch to another. It enables one phase domain to communicate with another phase domain at the same frequency.

One application of the invention is integration in a large die having a significant amount of clock skew. Integration of this clock crossing buffer circuit allows the data to realign with the circuits.

Another application of this invention is data phase alignment of data from a localized clock domain associated with one bit of a multi-bit communications channel to a system clock domain that is frequency locked to all bits of the multi-bit communications channel, but may vary in phase with respect to any given bit within the communications channel.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. A system for aligning data transferred across circuit boundaries having different clock domains, wherein a first clock signal operates in a first clock domain and a second clock signal operates in a second clock domain, said first and second clock signals of the same frequency but operating out of phase, said system comprising:

a buffer circuit comprising latch means receiving data clocked in said first clock domain and latching said received data in said second clock domain by one of a first edge of said second clock signal, or a second opposite edge of said second clock signal; and, a control circuit means for receiving said first and second clock signals and determining a phase relationship therebetween, said control circuit generating a control signal based on said determined phase relationship, said control signal implemented for selecting one of said first edge of said second clock signal, or said second opposite edge of said second clock signal, for said latch means latching action in said second clock domain, wherein reliable data transfer operation is provided for all possible phase relationships of said first and second clock signals.

2. The system as claimed in claim 1, wherein said latch means comprises:

a first latch device for receiving said data clocked in said first clock domain and clocked in said second clock domain, said first latch device generating a latched data output; and, a second latch device for receiving one of said received data clocked in said first clock domain or said latched data output from said first latch device in accordance with said control signal.

3. The system as claimed in claim 2, further comprising:

a multiplexor device receiving both said received data clocked in said first clock domain or said latched data output from said first latch device and selecting either of said received data clocked in said first clock domain or said latched data output from said first latch device in accordance with said control signal.

4. The system as claimed in claim 3, wherein each said first and second latch devices comprise an edge-triggered flip-flop device, a first edge of said second clock signal comprising one of a rising edge or falling edge, and said second clock edge comprising an opposite edge.

5. The system as claimed in claim 3, wherein a phase of said second clock signal is similar in phase to said first clock signal, said control signal enabling said second latch device to receive said latched data output from said first latch device.

6. The system as claimed in claim 3, wherein a phase of said second clock signal is opposite in phase to said first clock signal, said control signal enabling said second latch device to receive said received data clocked in said first clock domain.

7. The system as claimed in claim 3, wherein said control circuit comprises:
   means for receiving said first clock signal and generating a delayed first clock signal;
   a first data synchronization path comprising two or more serially connected latch devices, a first latch device thereof receiving said delayed first clock signal, each of said serially connected latch devices latched in by an edge of said second clock signal and generating first set of output signals thereof;
   a second data synchronization path comprising two or more serially connected latch devices, a first latch device thereof receiving said delayed first clock signal, each of said serially connected latch devices latched in by an opposite edge of said second clock signal and generating a second set of output signals thereof; and,
   a logic means receiving said first and second output signal sets and generating said control signal.

8. The system as claimed in claim 7, wherein said logic means comprises a finite state machine implementing logic for generating said control signal.

9. The system as claimed in claim 7, wherein said delayed first clock signal is delayed ¾ about of a clock cycle with respect to said first clock signal.

10. The system as claimed in claim 7, wherein said first synchronization path further comprises logic devices for receiving a latched output from each said two or more serially connected latch devices in said first path and generating first and second logic output signals therefrom, and said second synchronization path further comprises logic devices for receiving a latched output from each said two or more serially connected latch devices in said second path and generating third and fourth logic output signals therefrom, said finite state machine receiving each said first, second third and fourth logic output signals and applying a Boolean equation to generate said control signal.

11. The system as claimed in claim 1, wherein data is transferred across said circuit boundaries over an n-bit data path, said system comprising n buffer circuits, one buffer circuit for each data bit.

12. A system for aligning data transferred over an n-bit wide data path across circuit boundaries having different clock domains, wherein a first clock signal operates in a first clock domain and a second clock signal operates in a second clock domain, said first and second clock signals of the same frequency but operating out of phase, said system comprising:
   n buffer circuits each for receiving a single data bit of said n-bit wide path, each buffer circuit comprising a latch means for receiving data clocked in said first clock domain and latching said received data in second clock domain by one of a first edge of said second clock signal, or a second opposite edge of said second clock signal; and,
   a control circuit means for receiving said first and second clock signals and determining a phase relationship therebetween, said control circuit generating a control signal based on said determined phase relationship, said control signal implemented in each of said n buffer circuits for selecting one of said first edge of said second clock signal, or said second opposite edge of said second clock signal, for said latch means latching action in said second clock domain,
   wherein reliable data transfer operation is provided for all possible phase relationships of said first and second clock signals.

13. The system as claimed in claim 12, wherein said latch means of each buffer circuit comprises:
   a first latch device for receiving said data clocked in said first clock domain and clocked in said second clock domain, said first latch device generating a latched data output; and,
   a second latch device for receiving one of said received data clocked in said first clock domain or said latched data output from said first latch device in accordance with said control signal.

14. The system as claimed in claim 13, wherein each buffer circuit further comprises:
   a multiplexor device for receiving both said received data clocked in said first clock domain or said latched data output from said first latch device and selecting either of said received data clocked in said first clock domain or said latched data output from said first latch device in accordance with said control signal.

15. The system as claimed in claim 14, wherein said control circuit comprises:
   means for receiving said first clock signal and generating a delayed first clock signal;
   a first data synchronization path comprising two or more serially connected latch devices, a first latch device thereof receiving said delayed first clock signal, each of said serially connected latch devices latched in by an edge of said second clock signal and generating first set of output signals thereof;
   a second data synchronization path comprising two or more serially connected latch devices, a first latch device thereof receiving said delayed first clock signal, each of said serially connected latch devices latched in by an opposite edge of said second clock signal and generating a second set of output signals thereof; and,
   a logic means receiving said first and second output signal sets and generating said control signal.

16. A method for aligning data transferred across circuit boundaries having different clock domains, wherein a first clock signal operates in a first clock domain and a second clock signal operates in a second clock domain, said first and second clock signals of the same frequency but operating out of phase, said method comprising the steps of:
   a) receiving data supplied from a from a first clock domain circuit clocked by said first clock signal;
   b) determining a phase relationship between said first and second clock signals; and,
   c) latching said received data in said second clock domain by one of a first edge of said second clock signal, or a second opposite edge of said second clock signal based on said determined phase relationship, wherein reliable data transfer operation is provided for all possible phase relationships of said first and second clock signals.

17. The method as claimed in claim 16, wherein said determining step b) comprises the steps of:
receiving said first clock signal and generating a delayed first clock signal;
inputting said delayed first clock signal to a first latch device of a first data synchronization path comprising two or more serially connected latch devices clocked by an edge of said second clock signal in said second clock domain and generating a first set of output signals thereof;
simultaneously inputting said delayed first clock signal to a first latch device of a second data synchronization path comprising two or more serially connected latch devices clocked by an opposite edge of said second clock signal in said second clock domain and generating a second set of output signals thereof; and,
applying logic to said first and second set of output signals for determining said phase relationship.

18. The method as claimed in claim 17, wherein said latching step c) comprises the steps of:
latching data in said first clock domain by a first latch device clocked by said first clock signal and providing first latched data output;
inputting said first latched data output to a second latch device clocked by a second clock signal and providing second latched data output;
selecting said first latched data output and second latched data output based on said phase relationship; and,
inputting said selected first latched data output or second latched data output to a third latch device clocked by an opposite edge of said second clock signal.

19. The method as claimed in claim 18, wherein said first latched data output is selected for input to said third latch device when a phase of said second clock signal is similar in phase to said first clock signal, and said second latched data output is selected for input to said third latch device when a phase of said second clock signal is opposite in phase to said first clock signal.

20. A single stage clock crossing buffer for aligning data transferred across circuit boundaries having different clock domains, wherein a first clock signal operates in a first clock domain and a second clock signal operates in a second clock domain, said first and second clock signals of the same frequency but operating out of phase, the buffer comprising:
first latch means for receiving data supplied from a from a first clock domain circuit and clocked by said first clock signal to generate a latched output thereof;
means for determining a phase relationship between said first and second clock signals; and,
second latch means for latching said latched output in said second clock domain by one of a first edge of said second clock signal, or a second opposite edge of said second clock signal based on said determined phase relationship, wherein reliable data transfer operation is provided for all possible phase relationships of said first and second clock signals.

* * * * *